United States Patent [19]
Hasegawa

[11] Patent Number: 5,737,408
[45] Date of Patent: Apr. 7, 1998

[54] ECHO CANCELLING SYSTEM SUITABLE FOR VOICE CONFERENCE

[75] Inventor: Atsushi Hasegawa, Tokyo, Japan

[73] Assignee: NEC Corporation, Tokyo, Japan

[21] Appl. No.: 552,503

[22] Filed: Nov. 9, 1995

[30] Foreign Application Priority Data

Nov. 9, 1994 [JP] Japan ................................. 6-274128

[51] Int. Cl.⁶ ............................. H04M 1/60; H04M 9/08
[52] U.S. Cl. ................................... 379/390; 379/406
[58] Field of Search .............................. 379/410, 411, 379/406, 388, 389, 390; 370/286, 288, 289, 290

[56] References Cited

U.S. PATENT DOCUMENTS

| | | | |
|---|---|---|---|
| 4,629,829 | 12/1986 | Puhl et al. | 379/390 X |
| 4,764,954 | 8/1988 | Tsurusaki et al. | 379/390 |
| 5,050,160 | 9/1991 | Fuda | 379/406 X |
| 5,075,687 | 12/1991 | Chen et al. | 379/390 X |
| 5,099,472 | 3/1992 | Townsend et al. | 379/390 X |
| 5,313,498 | 5/1994 | Sano | 379/410 X |
| 5,343,521 | 8/1994 | Jullien et al. | 379/409 X |
| 5,353,348 | 10/1994 | Sendyk et al. | 379/410 |
| 5,365,583 | 11/1994 | Huang et al. | 379/390 |
| 5,384,843 | 1/1995 | Masuda et al. | 379/390 X |

FOREIGN PATENT DOCUMENTS 0 366 584   5/1990   European Pat. Off. .

OTHER PUBLICATIONS

Casar Corredera et al., "A System for Acoustic Echo Control," Signal Processing V: Theories and Applications, Proceedings of EUSIPCO-90, vol. III, Barcelona, Spain, Sep. 18-21, 1990.

Primary Examiner—Thomas W. Brown
Attorney, Agent, or Firm—Scully, Scott, Murphy & Presser

[57] ABSTRACT

An echo cancelling system has two echo cancellers for cancelling a channel echo and a room echo, respectively. In order to obviate echo estimation errors, the echo canceller at the channel side performs estimation only when an input signal from a channel is absent and a microphone input signal is present. The echo canceller at the room or acoustic side executes estimation only when a microphone input signal is absent and an input signal from the channel is present. A necessary amount of suppression is applied to either the receipt side or the transmission side until the echo canceller estimates an echo, so that a howling margin is guaranteed.

5 Claims, 11 Drawing Sheets

ECHO CANCELLING SYSTEM SUITABLE FOR VOICE CONFERENCE

BACKGROUND OF THE INVENTION

The present invention relates to an echo cancelling system and, more particularly, to an echo cancelling system suitable for a two-wire voice conference.

An echo canceller has customarily been used in order to suppress echoes to occur at a hybrid circuit which intervenes between a two-wire subscriber line and a four-wire channel constituting a transmission path. On the other hand, advances in the multifunction configuration of a telephone have led to a voice conference apparatus and a TV telephone apparatus incorporating it. The problem with this kind of voice conference apparatus is that noise inside and outside of a conference room is input to a microphone together with voice, obstructing the conference. The echo canceller is used to cancel such noise.

However, the conventional echo canceller for voice conferences estimates an echo of a direction opposite to an expected direction during the course of bidirectional conversation and at the end of a word, resulting in estimation errors. As a result, the echo canceller amplifies the echo rather than cancelling it, thereby bringing about howling.

SUMMARY OF THE INVENTION

It is, therefore, an object of the present invention to provide an echo cancelling system capable of cancelling echoes with accuracy.

It is another object of the present invention to provide an echo cancelling system capable of surely determining the timing for executing echo estimation, and thereby reducing an estimation time (convergence time) while stabilizing the amount of cancellation during bidirectional conversation.

An echo cancelling system of the present invention has a first echo estimator for estimating a channel echo component contained in a received signal due to a hybrid circuit, and capable of being activated by an external control signal. A second echo estimator estimates a room echo component contained in a signal to be sent and fed to the hybrid circuit, and capable of being activated by an external control signal. A first subtracter subtracts the channel echo component estimated by the first echo estimator from the received signal. A second subtracter subtracts the room echo component estimated by the second echo estimator from the signal to be sent. A first echo suppressor suppresses a residual echo of an output signal of the first subtracter by the received signal output from the first subtracter and the signal to be sent and output from the second subtracter, and outputs the resulting suppressed state. A second echo suppressor suppresses a residual echo of an output signal of the second subtracter by the signal to be sent and output from the second subtracter and the received signal output from the first subtracter, and outputs the resulting suppressed state. A first estimation controller determines a speech direction and an amount of suppression by referencing the received signal from the hybrid circuit, the output signal of the first subtracter, the signal to be sent and applied to the hybrid circuit, and the suppressed state output from the first echo suppressor, and generates the external control signal for the first echo estimator. A second estimation controller determines a speech direction and an amount of suppression by referencing the signal to be transmitted and fed from the microphone, the output signal of the second subtracter, the signal to be sent and fed to the speaker, and the suppressed state output from the second echo suppressor, and generates the external control signal for the second echo estimator.

BRIEF DESCRIPTION OF THE DRAWINGS

The above and other objects, features and advantages of the present invention will become more apparent from the following detailed description when taken with the accompanying drawings in which.

DETAILED DESCRIPTION OF THE PREFERRED EMBODIMENTS

To better understand the present invention, a brief reference will be made to a conventional echo cancelling system, shown in FIG. 1. As shown, an echo estimator 4 estimates an echo signal, i.e., a part of the output signal of a speaker 1 which turns round to a microphone 2. A subtracter 3 subtracts the estimated echo signal from an input signal from the microphone 2, thereby cancelling an echo. Another echo estimator 17 estimates an echo signal attributable to the turn-round of the output signal of a hybrid transformer 19, which is to be transmitted, to a received input signal. A subtracter 18 subtracts the echo signal estimated by the estimator 17 from a received input signal.

A residual echo suppressor 5 compares the output signal of the speaker 1 and that of the subtracter 3 as to their levels in order to determine a conversation condition, i.e., a direction in which conversation is held, thereby suppressing a residual echo. Another residual echo suppressor 16 compares the level of the signal to be output to a channel and that of the output of the subtracter 18 so as to determine a conversation condition, thereby suppressing a residual echo.

The operation of the echo estimator 4 is controlled by an estimation controller 9. Specifically, mean circuits 7 and 8 respectively produce the level of the speaker output signal and that of the microphone output signal and deliver them to the estimation controller 9. The estimation controller 9 compares the levels of the two input signals. If the microphone input signal is lower in level than the speaker output signal, the controller 9 causes the echo estimator 4 to perform estimation. Likewise, mean circuits 13 and 14 are connected to an estimation controller 11 and respectively feed to the controller 11 the input and output of the hybrid transformer. If the transformer input signal is lower in level than the transformer output signal, the controller 11 causes the echo estimator 17 to perform estimation.

However, the above echo cancelling system is apt to estimate echoes of the direction opposite to the expected direction during the course of bidirectional conversation or at the end of a word, resulting in estimation errors, as stated earlier. As a result, the system does not cancel echoes, but it amplifies them and brings about howling.

Figure 2:
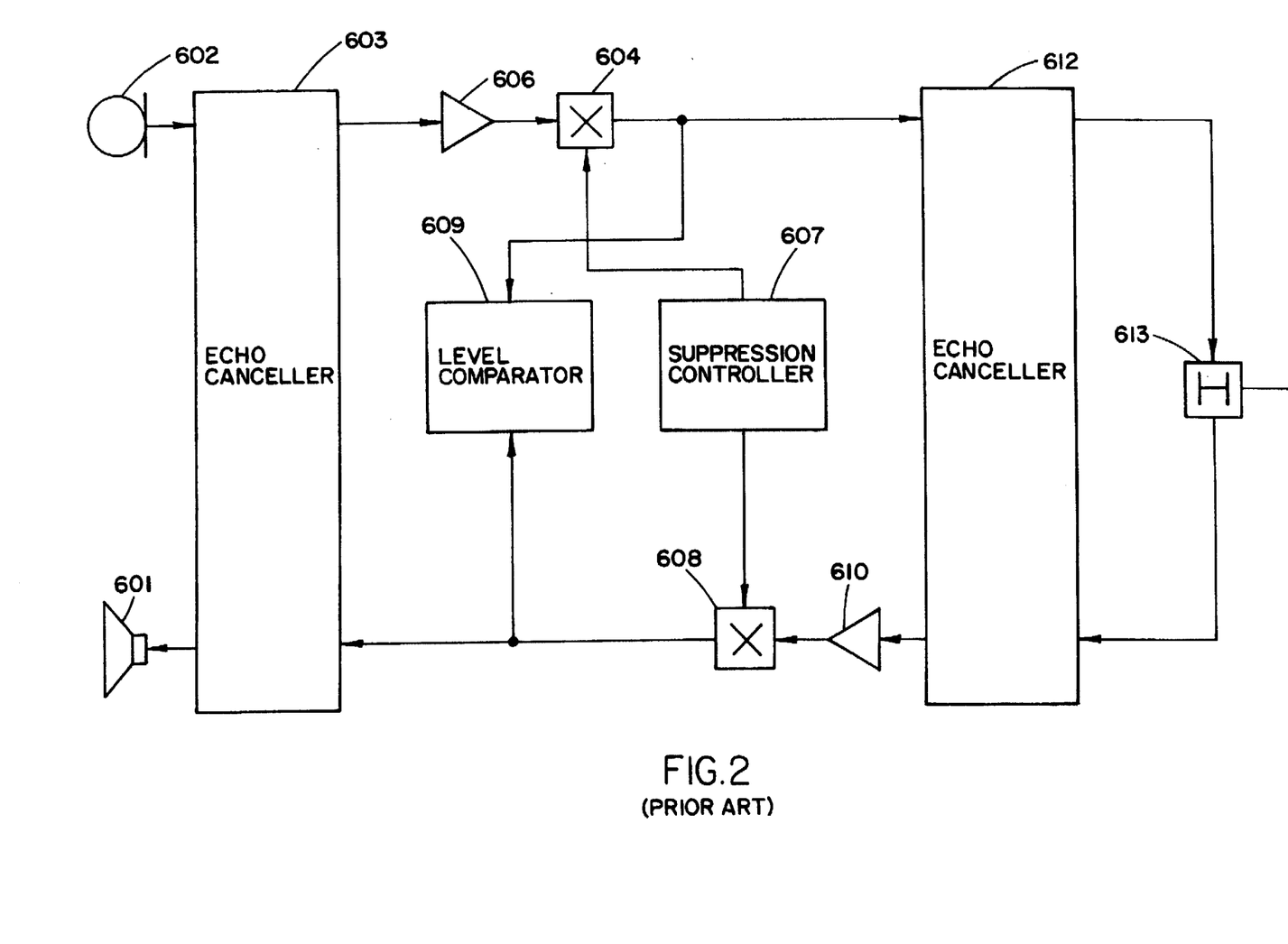

FIG. 2 shows another conventional echo cancelling system. As shown, the system has an echo canceller 603 for cancelling an echo signal attributable to the turn-round of the output of a speaker 601 to a microphone 602. An echo canceller 612 cancels an echo signal attributable to the turn-round of an output of a hybrid transformer 613, which is to be transmitted, to a received input. An amplifier 606 amplifies the output of the echo canceller 603 in order to prevent a residual echo remaining at the acoustic side from returning to the channel side. An amplifier 610 adjusts the signal level to reach the speaker 601. A multiplier 604 also prevents a residual echo remaining at the acoustic side from returning to the channel side. A multiplier 608 prevents a residual echo remaining at the channel side from returning to the speaker 601. A level comparator 609 compares the levels of the suppressed outputs of the multipliers 604 and 608 in order to determine which of the talkers is speaking, i.e., a speech direction as referred to hereinafter. The speech direction is fed to a suppression controller 607. If, for example, the output level of the multiplier 604 is higher than that of the multiplier 608, the suppression controller 607 reduces the amount of suppression assigned to the multiplier 604 while increasing the amount of suppression assigned to the multiplier 608.

The problem with the configuration shown in FIG. 2 is that when one of the echo cancellers 603 and 612 has not completed echo estimation, the level comparison described above fails to determine a speech direction with accuracy. For example, when the echo canceller 612 has not fully cancelled an echo, the microphone input signal is reflected by the transformer 613. As a result, an echo signal is amplified by the amplifier 610. When the amplification factor of the amplifier 610 is great, the level comparator 609 is likely to determine that the speaker output signal is higher in level than the microphone input signal. Moreover, it is impossible to determine speech direction accurately when it comes to an echo canceller situated at the room (acoustic) side for preventing a speaker output from turning round to a microphone input, and an echo canceller situated at the channel side for cancelling an echo reflected by a hybrid transformer.

Figure 3:
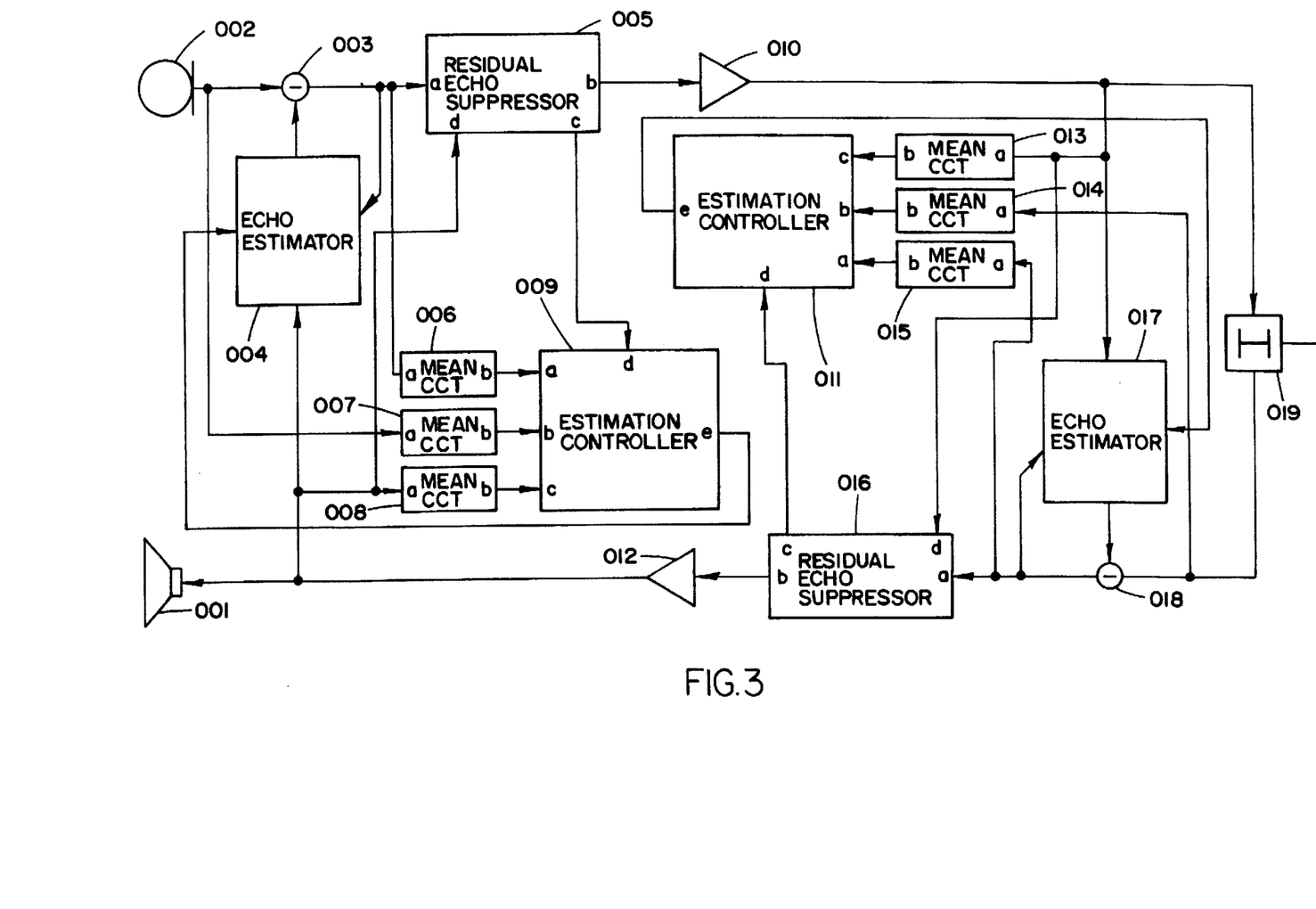
FIG. 3 is a block diagram schematically showing an echo cancelling system embodying the present invention.

Referring to FIG. 3, an echo cancelling system embodying the present invention will be described which constitutes an improvement over the conventional system shown in FIG. 1. In FIG. 3, the same or similar constituents as or to the constituents shown in FIG. 1 are designated by the same reference numerals. Because the embodiment controls echo estimation in the same manner at both the acoustic (room) side and the channel side, the following description will concentrate on a control circuit situated at the room side by way of example. The embodiment executes echo estimation on three different conditions, i.e., that a reference signal (speaker output signal) level be present (condition 1), that an amount of echo cancellation matching echo estimation be guaranteed (condition 2), and that a residual echo be sufficiently suppressed (condition 3).

As shown in FIG. 3, an echo estimator 4 detects the level of a signal to be output via a speaker 1 and thereby estimates an echo attributable to the turn-round of the speaker output signal to a microphone 2. A subtracter 3 subtracts the output of the estimator 4, i.e., a false error signal from the echo signal, thereby cancelling the echo. A residual echo suppressor 5 suppresses a residual echo left after the echo cancellation, thereby eliminating the return of the echo. A mean circuit 8 produces a mean value of the speaker output signal. An estimation controller 9 monitors the output signal of the mean circuit 8 to see if the condition 1 is satisfied or not. To determine whether or not the condition 2 is satisfied, mean circuits 7 and 6 respectively produce the mean value of the output signal of the microphone 2 and the mean value of the output signal of the subtracter 3, and deliver them to the estimation controller 9. The controller 9 compares the outputs of the mean circuits 6 and 7 so as to monitor the amount of echo cancellation. In addition, the controller 9 monitors the output of the residual echo suppressor 5 to see if the condition 3 is satisfied or not. An amplifier 10 adjusts the level of the microphone input signal to be transmitted. An amplifier 12 adjusts the level of a signal received over a channel and to be applied to the speaker 2.

Figure 4:
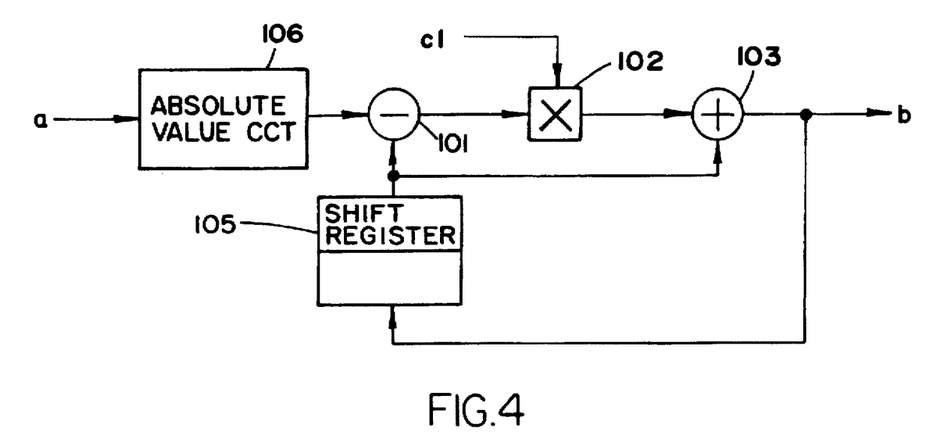
FIG. 4 is a schematic block diagram showing a mean circuit included in the embodiment.

FIG. 4 shows a specific configuration of each of the mean circuits 6, 7 and 8. As shown, the circuit has an absolute value circuit 106 for converting the input signal to an absolute value. A subtracter 101 produces a difference between the absolute value and the current mean value. A multiplier 102 multiplies the difference by a certain small value (c1). The resulting product is added to the current mean value by an adder 103. As a result, if the input is smaller than the current mean value, a negative value is added to the current mean value while, if the former is greater than the latter, a positive value is added to the current mean value. The output of the adder 103 is shifted by the shift register 105 and used as a current mean value for the next input signal.

Figure 5:
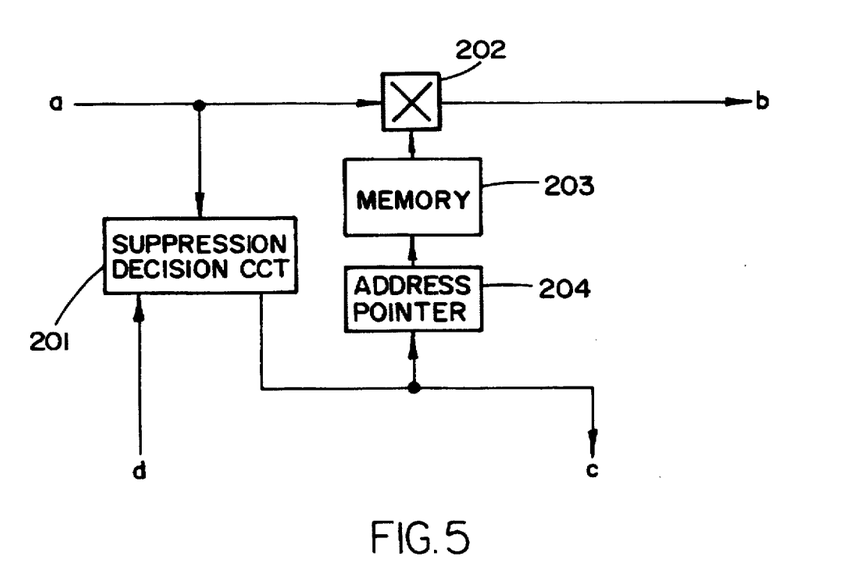
FIG. 5 is a schematic block diagram showing a residual echo suppressor also included in the embodiment.

FIG. 5 shows a specific configuration of each of the residual echo suppressors 5 and 16. The echo suppressor detects a speech direction and suppresses the residual echo remaining after the echo cancellation. For the detection of a speech direction, the suppressor 5 has a decision circuit 201 for comparing the level of the speaker output signal and that of the signal undergone echo cancellation. For example, when the speaker output signal is sufficiently higher in level than the signal produced by cancelling the echo of the microphone input signal (e.g. by 12 dB), the decision circuit 201 determines that suppression should be executed, and then changes the address. Data stored in a memory 203 for suppression and designated by an address pointer 204 is read out. A multiplier 202 multiplies the input signal by the suppression data.

Figure 6:
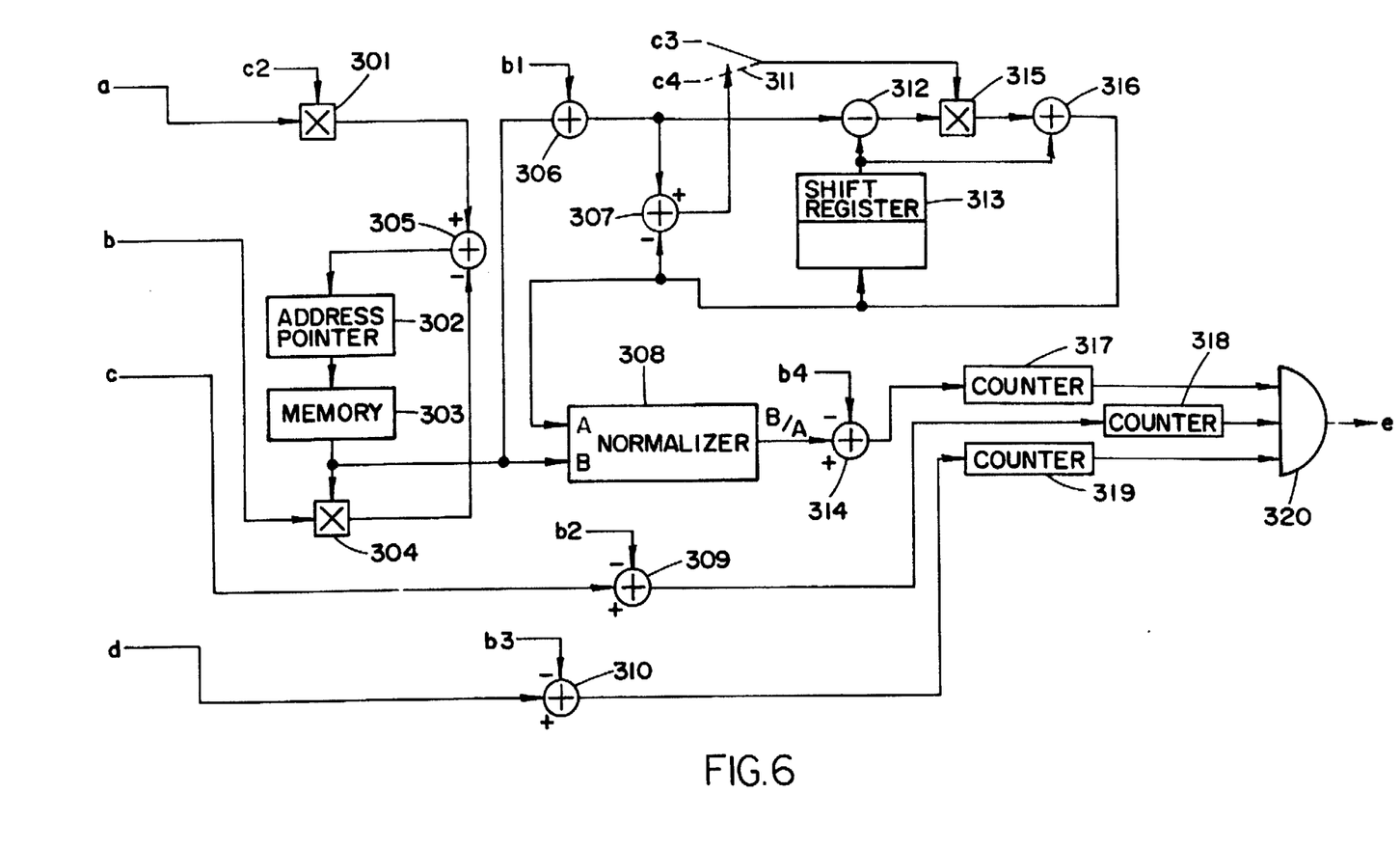
FIG. 6 is a schematic block diagram showing an estimation controller further included in the embodiment.

The estimation controllers 9 and 11 each has a specific construction shown in FIG. 6. Whether or not the condition 1 is satisfied is decided as follows. A subtracter 309 subtracts a certain threshold value b2 from a signal C representative of the mean value of the speaker output signal and output from the mean circuit 8. A counter 318 is incremented or decremented, depending on the level of the output of the subtracter 309. The level of the speaker output signal is monitored on the basis of the value of the counter 318. If the signal level is present, the counter 318 produces a logical ONE; if otherwise, it produces a logical ZERO.

Regarding the condition 3, a subtracter 310 subtracts a certain threshold value b3 from a signal d representative of suppression/unsuppression and output from the echo suppressor 5. A counter 319 is incremented or decremented, depending on the level of the output of the subtracter 310. The counter 310 produces a ONE in the event of suppression or a ZERO in the event of unsuppression, i.e., when the signal level is absent.

To determine whether or not the condition 2 is satisfied, a signal b representative of the mean value of the microphone input signal and output from the mean circuit 7 is compared with the output a of the mean circuit 6. This produces an amount of echo cancellation executed by the echo canceller.

Specifically, a multiplier 301 multiplies the signal level a undergone echo cancellation by a certain bias c2. A multiplier 304 multiplies the microphone input signal level b by a value fed from an address pointer 302 and a memory 303. The address pointer 302 designates the addresses of the memory 303 such that the difference between the outputs of the multipliers 301 and 304 becomes zero. The output of the memory 303 is, therefore, representative of the result of comparison between the microphone input signal level and the signal level with the bias c2 and effected by the above feedback; that is, it is representative of an amount of echo cancellation containing the bias. In addition, the amount of echo cancellation (instantaneous amount) is attainable by substantially real-time calculation due to the time constant of the mean circuit.

Subsequently, relatively great instantaneous amounts of echo cancellation are stably averaged to produce a mean value (estimated amount of cancellation). A subtracter 307 determines whether or not the instantaneous amount of cancellation is greater than the current estimated amount of cancellation. If the answer of this decision is positive, a switch 311 selects a comparatively great coefficient c3; if otherwise, it selects a comparatively small coefficient c4.

A subtracter 312 produces a difference between the output of a shift register 313 representative of the mean value (estimated amount of cancellation) and the output of an adder 306, i.e., the sum of the instantaneous amount of cancellation and a bias b1, as in the mean circuit shown in FIG. 4. A multiplier 315 multiplies this difference by the coefficient c3 or c4 selected by the switch 311. The adder 316 adds the output of the shift register 313 to the output of the multiplier 315. The resulting output of the adder 316 is written to the shift register 313 for the next processing. A normalizer 308 normalizes the instantaneous amount of cancellation by the estimated amount of cancellation. As a result, a speech direction can be detected without regard to the echo estimating procedure. Specifically, when the instantaneous amount of cancellation approaches the estimated amount, it is possible to determine that the speech is the talker's independent speech output from the speaker. As the instantaneous amount parts from the estimated amount, it is possible to determine that the speech is the talker's independent speech input from the microphone or that it is an interruptive speech. Even during the echo estimation procedure wherein the amount of cancellation is not sufficient, a decision can be made adaptively.

A subtracter 314 subtracts a certain threshold value b4 from the output of the normalizer 308 so as to determine a speech condition. A counter 317 is incremented or decremented on the basis of the result of the above decision. The speech condition of the suppressor is monitored in terms of the value of the counter 317. The counter 317 produces a ONE if the talker's independent speech is output from the speaker or produces a ZERO if otherwise.

The outputs of the three counters 319, 318 and 317 are fed to an AND gate 320. In response, the AND gate 320 produces an output indicative of whether or not estimation should be executed. The echo estimator 4 (17) stops (inactivates) or executes (activates) estimation.

The above decision also applies to echo estimation control to be effected at the channel side. Assume that the residual echo suppressors at the acoustic side and channel side are operated in association with each other. Then, it is possible to link the estimation control of the echo canceller at the acoustic side and the estimation control of the echo canceller at the channel side also.

Figure 7:
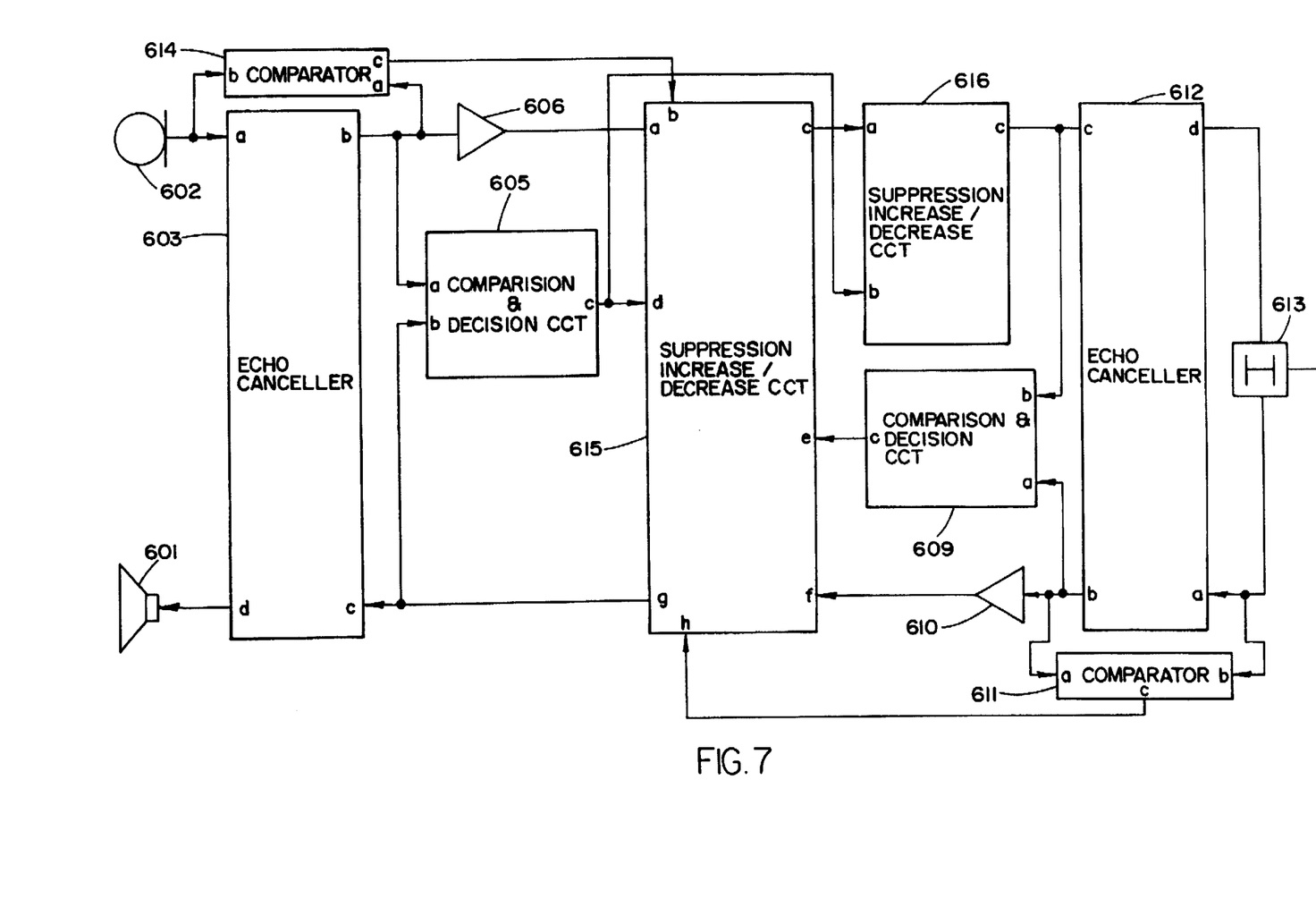
FIG. 7 is a block diagram schematically showing an alternative embodiment of the present invention.

Referring to FIG. 7, an alternative embodiment of the present invention is shown which constitutes an improvement over the conventional system shown in FIG. 2. In FIG. 7, the same or similar constituent parts as or to the parts of FIG. 2 are designated by the same reference numerals. Usually, a conference apparatus using a channel is implemented by a two-wire circuit, as shown in FIG. 7 (although it may be implemented as an interface between the speaker and the microphone of a telephone set). An echo canceller 612 cancels echoes that occur at a hybrid transformer 613 (referred to as channel echoes hereinafter). An echo canceller 603 cancels echoes that occur in the room due to the turn-round of the output of a speaker 601 to a microphone 602 (referred to acoustic echoes hereinafter). Suppression increase/decrease circuits 615 and 616 suppress at adequate timings the residual echoes remaining after echo cancellation effected at the echo cancellers 603 and 612.

A speech signal coming in through the hybrid transformer 613 over the channel (referred to as a received input signal hereinafter) is applied to an amplifier 610 via the echo canceller 612 and amplified to a necessary level thereby. The output of the amplifier 610 is routed through the suppression increase/decrease circuit 615 (not suppressed at this time), provided as a reference to the echo canceller 603, and then output via a speaker 601 (speaker output signal). On the other hand, a speech signal output from the microphone 602 is applied to an amplifier 606 via the echo canceller 603. The amplifier 606 amplifies the input to a necessary level. The output of the amplifier 606 is routed through the suppression increase/decrease circuit 615 (not suppressed at this time) and suppression increase/decrease circuit 616, provided as a reference to the echo canceller 612, and then sent over the channel via the transformer 613.

The acoustic echo signal is returned in the transmission direction as a residual echo remaining after the cancellation by the echo canceller 603. The channel echo is returned in the speaker output direction as a residual echo remaining after the cancellation by the echo canceller 612.

In the above closed loop system, the suppression increase/decrease circuit 615 is added in order to guarantee a howling margin as to the entire system. The circuit 615 monitors the amounts of echo cancellation of the echo cancellers 603 and 612 via level comparators 614 and 611, respectively, thereby calculating amounts of suppression necessary for the howling margin. Comparison and decision circuits 605 and 609 respectively compare the reference signals c of the echo cancellers 603 and 612 with outputs b undergone echo cancellation as to the level, thereby determining a speech direction. The suppression increase/decrease circuit 615, based on the result of the decision, inserts or removes an amount of suppression necessary for the howling margin into or from the output of the amplifier 606 or 610. The suppression increase/decrease circuit 616, based on the output of the comparison and decision circuit 605, inserts or removes a necessary amount of suppression such that the residual echo of the transmission output does not return.

Figure 8:
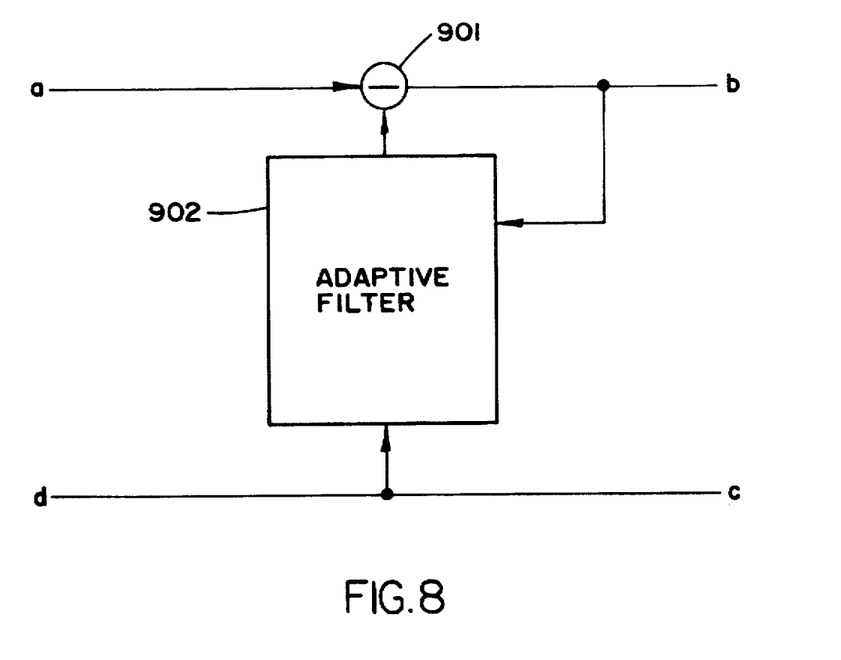
FIG. 8 is a schematic block diagram showing an echo canceller included in the embodiment of FIG. 7.

The echo cancellers 603 and 612 each has a specific configuration shown in FIG. 8. As shown, the echo canceller has a conventional adaptive filter 902 and a subtracter 901.

The adaptive filter, or echo estimator, 902 generates a false echo by referencing the received input signal c. The subtracter 901 subtracts the false echo from the transmission input signal a, thereby cancelling the echo. The echo estimation is executed such that the output of the subtracter 901 approaches zero.

Figure 1:
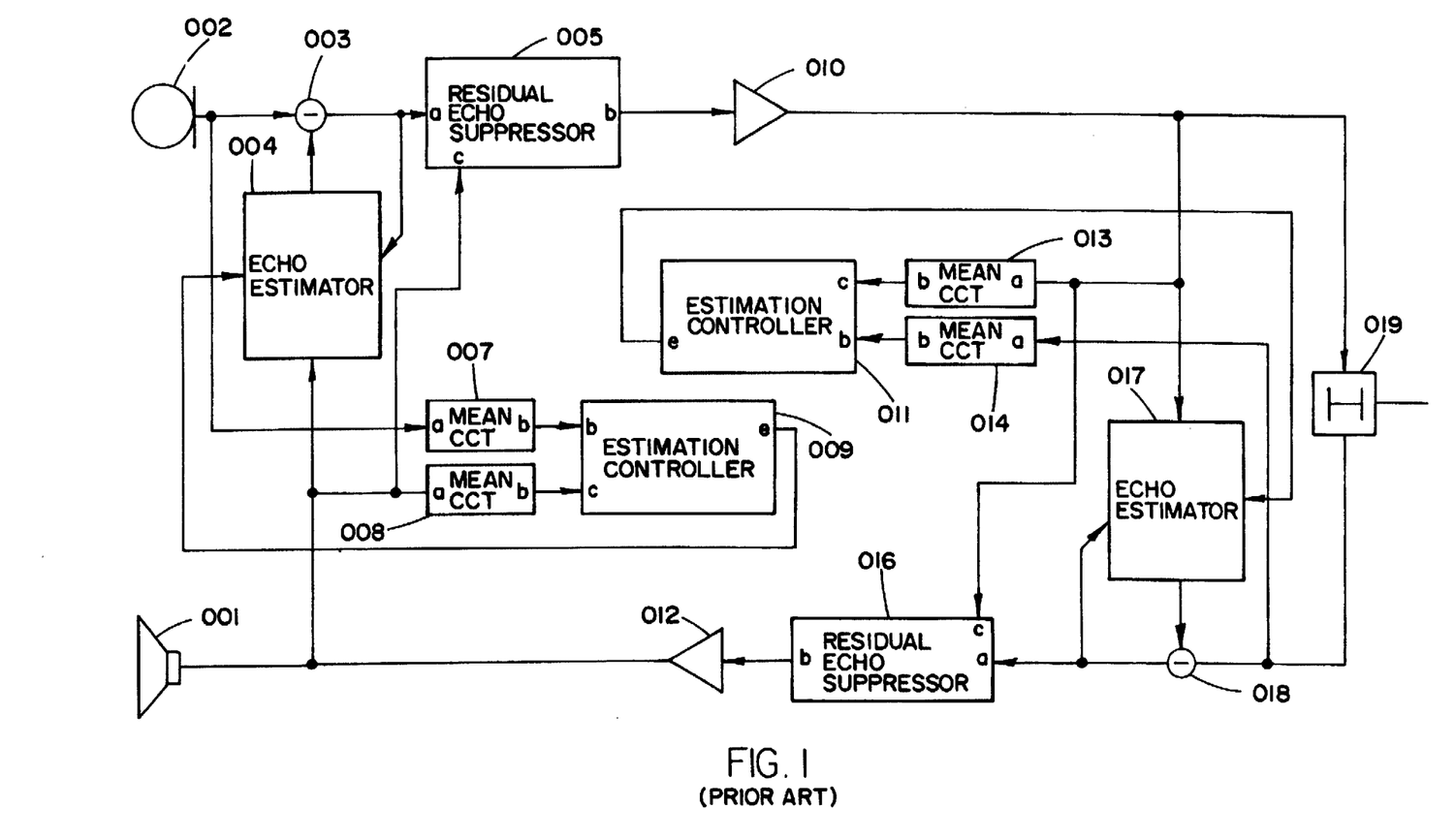
FIGS. 1 and 2 are block diagrams each schematically showing a particular conventional echo cancelling system.

The echo estimators 4 and 17 shown in FIG. 1 are each implemented by the adaptive filter of FIG. 8.

Figure 9:
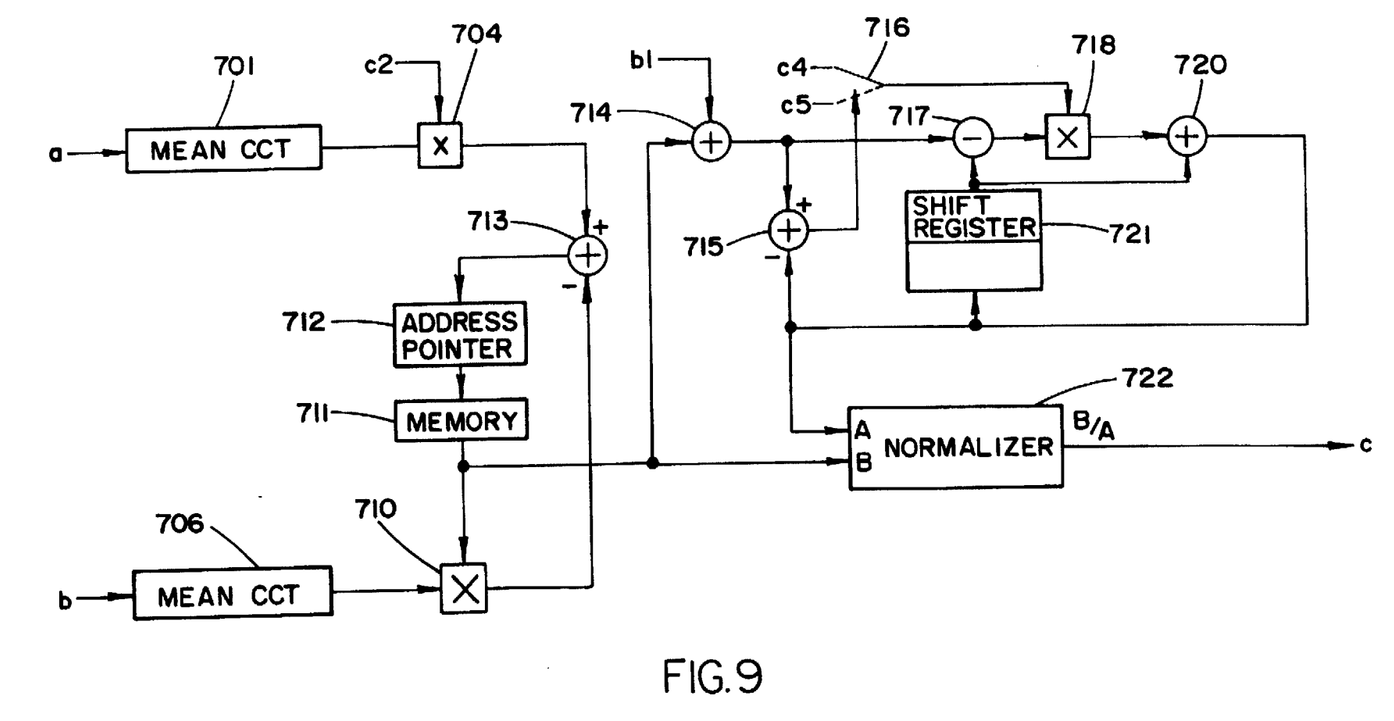
FIG. 9 is a schematic block diagram showing a comparison and decision circuit also included in the embodiment of FIG. 7.

FIG. 9 shows a specific construction of each of the comparison and decision circuits 605 and 609 shown in FIG. 7. Briefly, the comparison and decision circuit determines a difference in level between the transmission output signal b of the echo canceller 603 or 612 and the received input signal a, and produces a mean value of relatively great differences so as to estimate a signal level difference during monodirectional speech. For this purpose, a mean circuit 701 averages the input signals a by giving a certain time constant thereto. A multiplier 704 multiplies the output of the mean circuit 701 by a certain bias c2. Likewise, a mean circuit 706 produces a mean value of the input signals b by giving a certain time constant thereto. A multiplier 710 multiplies the output of the mean circuit 706 by an output of a memory 711 corresponding to a level comparator. A subtracter 713 compares the outputs of the multipliers 704 and 710. An address pointer 712 is varied such that the result of comparison output from the subtracter 713 approaches zero.

The output of the memory 711 varies at a rate depending on the time constant for averaging. For example, when the time constant for averaging is great, the output of the memory 711 varies at a high rate. The output of the memory 711 is representative of a value temporarily following the input signal (referred to as an instantaneous level comparison value hereinafter). To stably average relatively great instantaneous level comparison values (referred to as mean level comparison values hereinafter), either a coefficient c4 or a coefficient c5 is selected. Specifically, a switch 716 selects a great coefficient if the instantaneous level comparison value is greater than the mean level comparison value, as indicated by the output of a subtracter 715, or selects a small coefficient if otherwise. A subtracter 717 produces a difference between the output of a shift register 721, i.e., the current mean level comparison value and the instantaneous level comparison value. A multiplier 718 multiplies the output of the subtracter 717 by the coefficient c4 or c5 selected by the switch 716. An adder 720 adds the output of the multiplier 718 to the current mean level comparison circuit. The resulting output of the adder 720 is written to the shift register 721 as a mean level comparison value for the next processing. A normalizer 722 divides the instantaneous level comparison value by the mean level comparison value, thereby normalizing the current instantaneous level comparison value. When the value at the comparison and decision circuit 605 at the acoustic side is great, the output of the normalizer 722 shows that the speaker output signal is greater than the microphone input signal. Conversely, when the value at the comparison and decision circuit 609 at the channel side is great, the output of the normalizer 722 indicates that the line output signal is greater than the line input signal.

Figure 10:
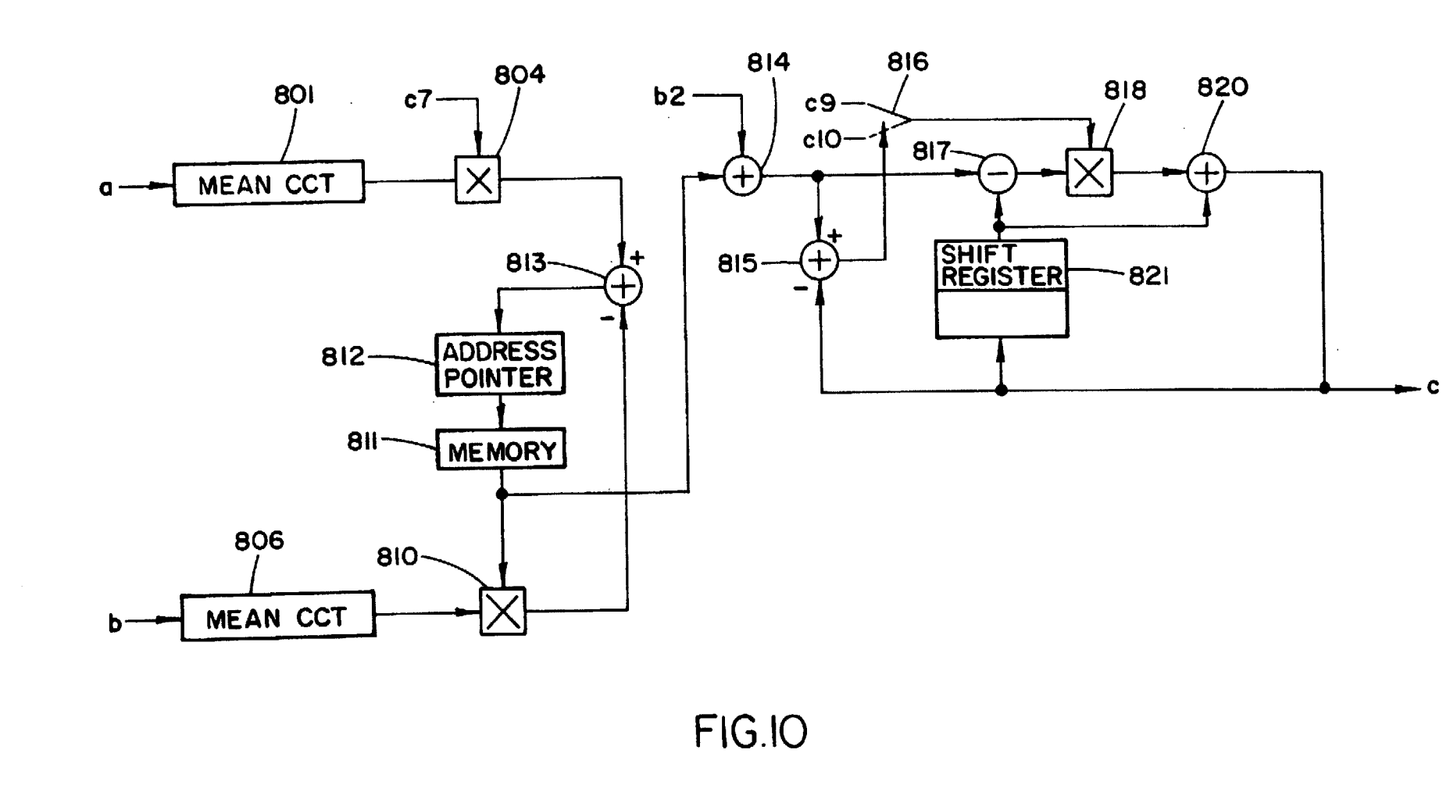
FIG. 10 is a schematic block diagram showing a level comparator also included in the embodiment of FIG. 7.

Level comparators 611 and 614, FIG. 7, each has a specific configuration shown in FIG. 10. Briefly, the level comparator follows the amount of cancellation of the echo canceller 603 or 612 instantaneously and measures it (instantaneous amount of cancellation), and then produces the mean value of relatively great instantaneous amounts to thereby estimate an amount of cancellation at the current estimation condition (mean amount of cancellation). For the measurement of the instantaneous amount of cancellation, a mean circuit 801 averages the input signals a by giving a certain time constant thereto. A multiplier 804 multiplies the output of the mean circuit 801 by a bias c7. Likewise, a mean circuit 806 averages the input signals b by giving a certain time constant thereto. A multiplier 810 multiplies the output of the mean circuit 806 by the output of a memory 811 corresponding to a level comparison value. A subtracter 813 compares the outputs of the multipliers 804 and 810. An address pointer 813 is varied such that the result of comparison output form the subtracter 813 approaches zero. The rate at which the output of the memory 811 varies is determined by the time constant for averaging. For example, when the time constant is great, the output of the memory 811 varies at a high rate. To stably average the relatively great instantaneous amounts of cancellation, one of two coefficients c9 and c10 is selected at a time. Specifically, a subtracter 815 determines the time when the instantaneous amount of cancellation is greater than the mean amount of cancellation. Then, the subtracter 815 causes a switch 816 to select great one of the coefficients c9 and c10. When the former is smaller than the latter, the subtracter 815 causes the switch 816 to select smaller one of the coefficients c9 and c10. A subtracter 817 produces a difference between the output of the shift register 821, i.e., the current mean level comparison value and the instantaneous level comparison value. A multiplier 818 multiplies the output of the subtracter 817 by the coefficient c9 or c10 selected. An adder 820 adds the resulting output of the multiplier 818 to the current mean level comparison value. The output of the adder 820 is written to a shift register 821 as a mean level comparison value for the next processing. The mean amount of cancellation is output as an estimated amount of cancellation.

Figure 11:
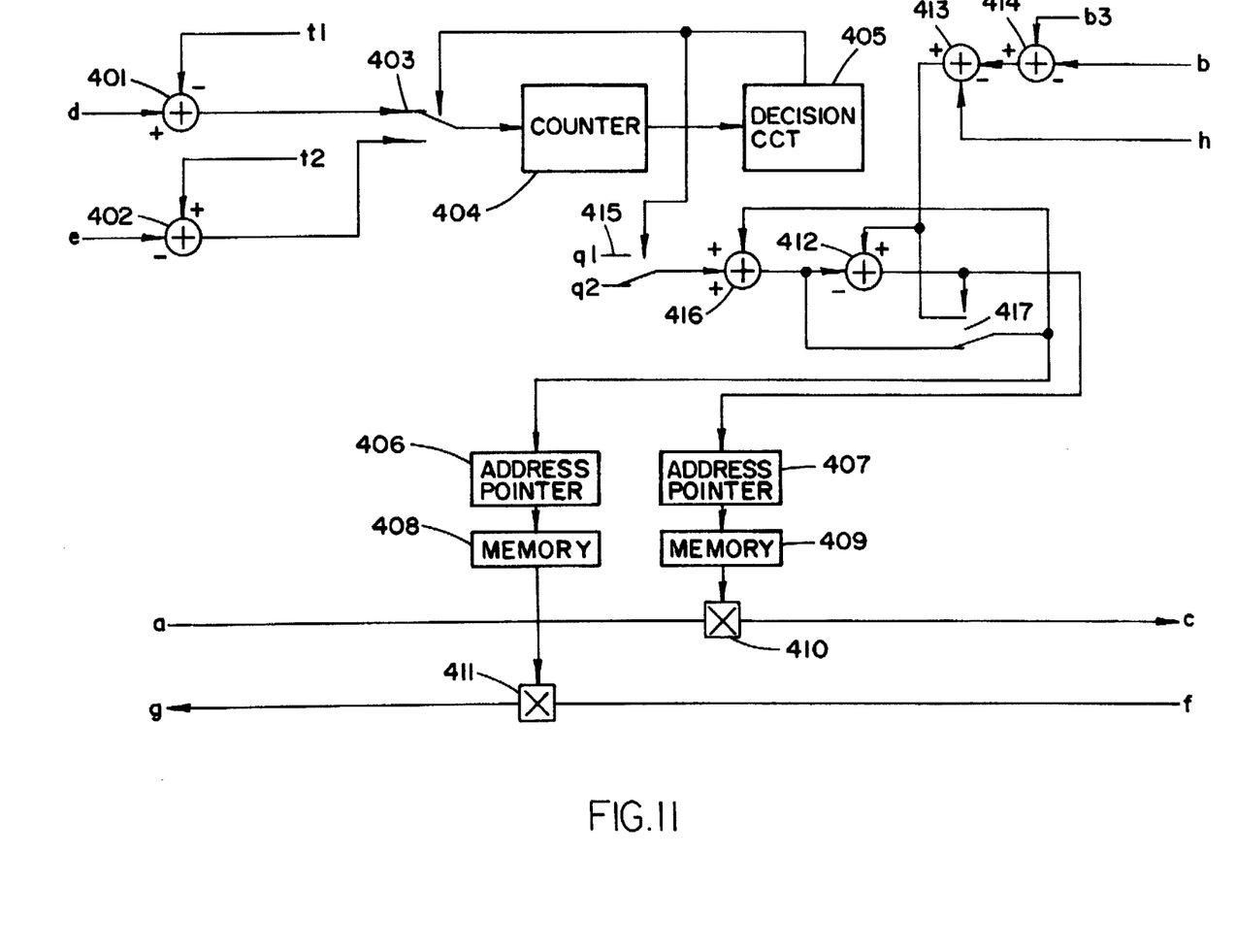
FIG. 11 is a schematic block diagram showing a suppression increase/decrease circuit further included in the embodiment of FIG. 7.

FIG. 11 shows a specific configuration of the suppression increase/decrease circuit 615, FIG. 7. The circuit 615 is used to guarantee the howling margin up to the step in which the amounts of cancellation of the echo cancellers 603 and 612 are guaranteed (echo estimation procedure). For this purpose, subtracters 414 and 413 respectively subtract inputs b and h from the level comparators 614 an 611 from a constant b3, thereby calculating a necessary amount of suppression. A decision circuit 405 determines a speech direction and causes a switch 403 to select a particular criterion for determining a speech direction. For example, when the decision circuit 405 determines that the current speech is from the line input side, the switch 403 selects the output of a subtracter 401 which subtracts a threshold value t1 from the output d of the comparison and decision circuit 605. When the current speech is from the microphone input side, the switch 403 selects the output of a subtracter 402 which subtracts a threshold value t2 from the output e of the comparison and decision circuit 609. A counter 404 is incremented or decremented on the basis of the output of the switch 403. The decision circuit 405 determines a speech direction on the basis of the value of the counter 404. A switch 415 is operated by the resulting output of the decision circuit 405. An adder 416 selectively increments or decrements an address pointer 406 in response to a constant q1 or q2 (e.g. +1 or −1) selected by the switch 415. At this instant, the output of the adder 413 which is the amount of suppression necessary for the howling margin is used as the maximum value; when the value exceeds the maximum value, a switch 417 selects the maximum value. The address of a memory 408 is determined by the value selected by the switch 417. A multiplier 411 suppresses the signal with the output of the memory 408. On the other hand, an adder 412 produces a difference between the above maximum value and the output of the adder 416. An address pointer 407 determines the address of a memory 409 in response to the output of the adder 412. As a result, a multiplier 410 executes suppression with the output of the memory 409. The total amount of suppression effected by the two multipliers 410 and 411 corresponds to the above maximum value at all times. With this value, it is possible to guarantee the howling margin of the system.

Figure 12:
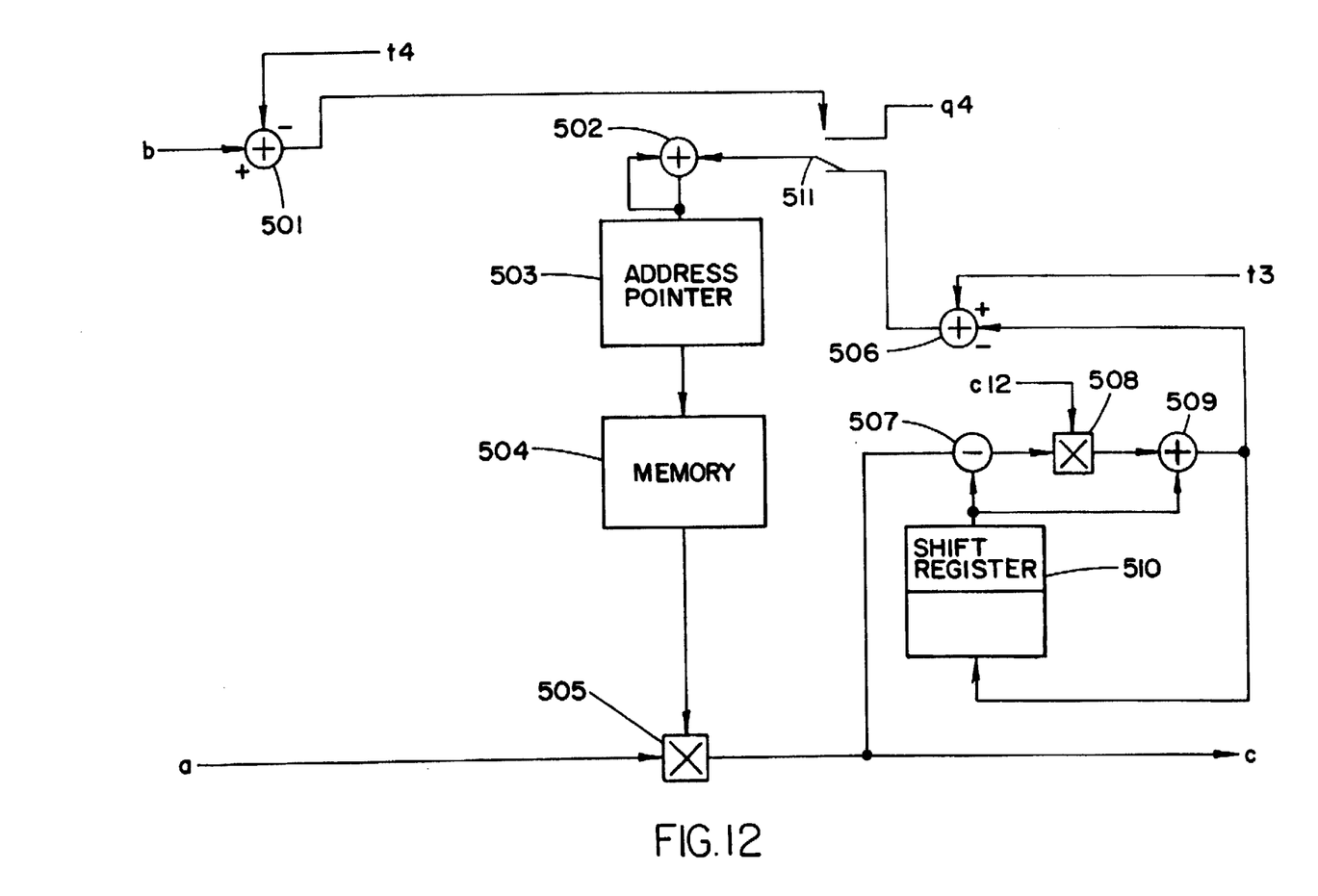
FIG. 12 is a schematic block diagram showing another suppression increase/decrease circuit additionally included in the embodiment.

FIG. 12 shows a specific construction of the suppression increase/decrease circuit 616. The circuit 615 performs an auxiliary operation with the residual echo left in the channel transmission direction after the operation of the suppression increase/decrease circuit 615. In the above system, the residual echo is greater at the acoustic side than at the channel side, i.e., the amount of cancellation available with the echo canceller at the acoustic side is smaller than the amount available with the echo canceller at the channel side. This is attributable to, for example, nonlinear transmission particular to the echo path at the acoustic side, and the variation of the echo path which is comparatively great. Specifically, as shown in FIG. 12, a subtracter 501 subtracts a threshold value t4 from the output b of the comparison and decision circuit 605 so as to determine whether or not to execute suppression. The threshold value t4 is selected to be greater than the threshold value t1 of the circuit 615. With the difference between the threshold values t4 and t1, it is possible for each the circuits 615 and 616 to execute a particular decision. A switch 511 is operated by the output of the subtracter 501 and selects a criterion for varying an address pointer 503. When suppression should be reduced, an adder 502 varies an address pointer 503 in the direction for reducing suppression by a negative constant q4. When suppression should be increased, the switch 511 selects the output of the subtracter 506 and thereby controls the suppressed level to a given value t3. A mean circuit 507 detects the suppressed signal level. A subtracter 506 subtracts a given level t3 from the detected signal level. The resulting output of the subtracter 506 is fed back to the address pointer 503 via the adder 502. The adder 502 varies the address pointer 503. As a result, a value to multiply is output from the memory 504.

While the present invention has been described in connection with certain preferred embodiments, it is to be understood that the subject matter encompassed by the present invention is not limited to those specific embodiments. On the contrary, it is intended for the subject matter of the present invention to include all alternatives, modifications and equivalents as can be included within the spirit and the scope of the following claims.

What is claimed is:

1. A two wire voice conference apparatus for receiving a microphone signal from a microphone and providing a speaker signal to a speaker through a hybrid circuit that connects the microphone to the speaker through a channel, said apparatus comprising:

first echo estimating means for estimating a channel echo component contained in the speaker signal due to the hybrid circuit, said first echo estimating means being activated by a first external control signal;

second echo estimating means for estimating a room echo component contained in a hybrid input signal provided to said hybrid circuit, said second echo estimating means being activated by a second external control signal;

first subtracting means for subtracting the channel echo component from the microphone signal and providing a first subtracted output signal;

second subtracting means for subtracting the room echo component from a hybrid output signal provided from said hybrid circuit and providing a second subtracted output signal;

first echo suppressing means for suppressing a residual echo of the first subtracted output signal and providing said hybrid input signal and a first suppressed signal;

second echo suppressing means for suppressing a residual echo of the second subtracted output signal and providing said speaker signal and a second suppressed signal;

first estimation control means for determining a first speech direction and a first amount of suppression by referencing the speaker signal, the first subtracted output signal, the microphone signal and the first suppressed signal, and for generating said first external control signal; and second estimation control means for determining a second speech direction and a second amount of suppression by referencing the hybrid input signal, the second subtracted output signal, the hybrid output signal and the second suppressed signal, and for generating said second external control signal.

2. An apparatus as claimed in claim 1, further comprising a plurality of averaging means for respectively averaging the speaker signal, the first subtracted output signal, the microphone signal, the hybrid input signal, the hybrid output signal, and the second subtracted output signal to thereby output respective mean values, wherein said first and second estimation control means reference said mean values.

3. An apparatus as claimed in claim 1, wherein said first suppressing means comprises:

a first suppression decision circuit for determining the first amount of suppression in response to the first subtracted output signal and the speaker signal;

a first address pointer for determining a first address in response to the first suppressed signal provided from said first suppression decision circuit;

a first memory for outputting first data designated by a first output address of said first address pointer; and a first multiplier for multiplying the first data from said first memory and the first subtracted output signal to provide said hybrid input signal;

said second suppressing means comprising:

a second suppression decision circuit for determining the second amount of suppression in response to the second subtracted output signal and the hybrid input signal;

a second address pointer for determining a second address in response to the second suppressed signal provided from said second suppression decision circuit;

a second memory for outputting second data designated by a second output address of said second address pointer; and a second multiplier for multiplying the second data from said second memory and the second subtracted output signal.

4. An apparatus as claimed in claim 1, wherein said first estimation control means comprises:

first setting means set when the microphone signal is greater than a first predetermined value;

second setting means set when the amount of suppression of said first echo suppressing means is greater than a second predetermined value;

means for comparing speaker signal and the first subtracted output signal to thereby calculate a first amount of echo cancellation of said first subtracting means;

means for calculating a first mean value of the amount of echo cancellation;

means for determining the first speech direction on the basis of the first mean value and the first amount of echo cancellation;

third setting means set in accordance with the determined first speech direction; and means for generating said first external control signal in accordance with statuses of said first to third setting means;

said second estimation control means comprising:

fourth setting means set when the hybrid output signal is greater than a third predetermined value;

fifth setting means set when the amount of suppression of said second echo suppressing means is greater than a fourth predetermined value;

means for calculating an amount of echo cancellation of said second subtracting means by comparing the hybrid input signal and the second subtracted output signal;

means for calculating a second mean value of a second amount of echo cancellation;

means for detecting the second speech direction on the basis of the second mean value and the second amount of echo cancellation;

sixth setting means set in accordance with the determined second speech direction; and means for generating said second external control signal in accordance with statuses of said fourth to sixth setting means.

5. A two-wire voice conference apparatus for receiving a microphone signal from a microphone and providing a speaker signal to a speaker through a hybrid circuit that connects the microphone to the speaker through a channel, said apparatus comprising:

a first echo canceler for canceling a channel echo component contained in the speaker signal by referencing the microphone signal and providing a first echo canceled signal;

first level comparing means for comparing the microphone signal and the first echo canceled signal;

first comparing and deciding means for comparing the first echo canceled signal and the speaker signal, and providing a first decision signal to a first suppression adjustment means for producing a first adjusted signal;

a second echo canceler for canceling a room echo component contained in a second adjusted signal provided from a second suppression adjustment means to the hybrid circuit by referencing a hybrid output signal from the hybrid circuit and providing a second echo canceled signal to the first suppression adjustment means;

second level comparing means for comparing the hybrid output signal and the second echo canceled signal; and second comparing and deciding means for comparing the second echo canceled signal and the second suppressed signal, and producing a second decision signal;

said first suppression adjustment means determining a maximum amount of suppression in response to output signals from said first and second level comparing means while determining a conversation condition in response to decision signals, and for selectively adjusting a suppression of the first and second echo canceled signals; and said second suppression adjustment means further adjusting a suppression of the first adjusted signal in accordance with the first decision signal.

* * * * *